May 26, 1959 C. W. ROSE 2,888,063
CHILD'S SAFETY BELT
Filed Aug. 18, 1955 2 Sheets-Sheet 1
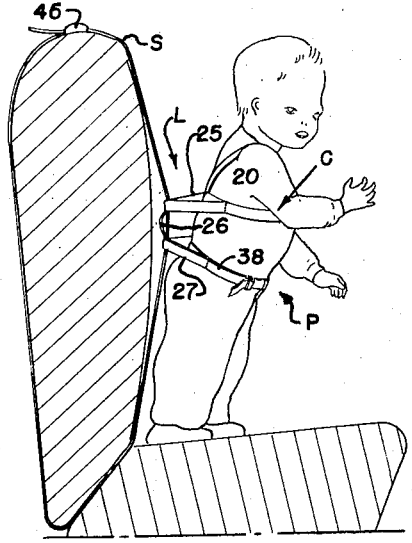
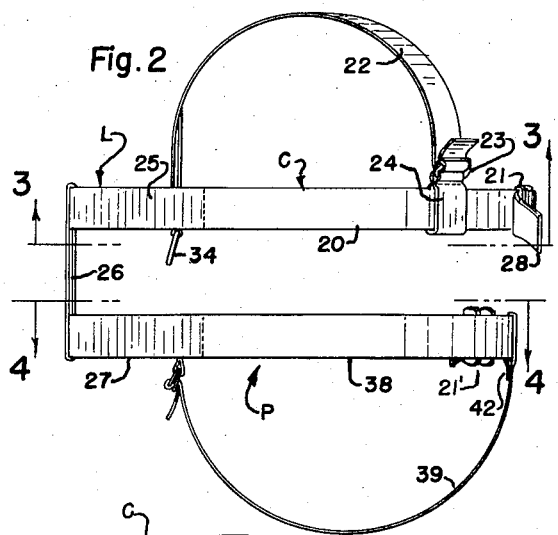
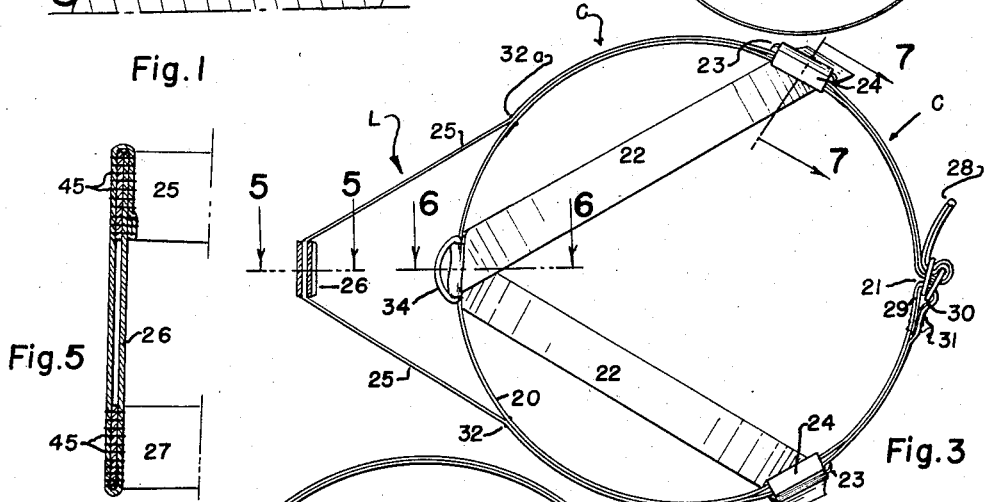
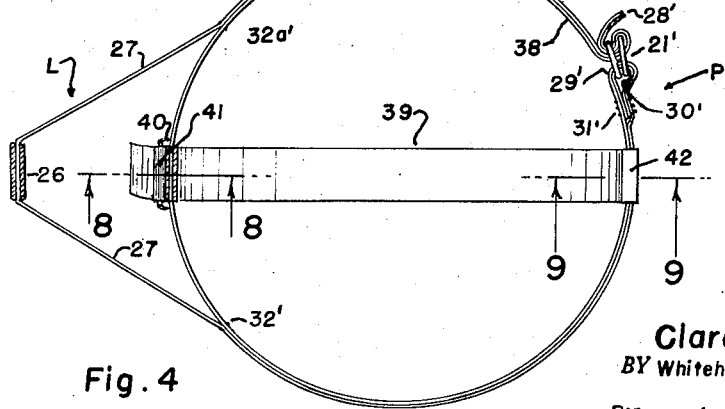
INVENTOR.
Clarence W. Rose
BY Whitehead, Vogl & Lowe
Per Frank C. Lowe
ATTORNEYS May 26, 1959 C. W. ROSE 2,888,063
CHILD'S SAFETY BELT
Filed Aug. 18, 1955 2 Sheets-Sheet 2

INVENTOR.
Clarence W. Rose
BY Whitehead, Vogl & Lowe
Per Frank C. Lowe
ATTORNEYS

United States Patent Office 2,888,063
Patented May 26, 1959

2,888,063

CHILD'S SAFETY BELT

Clarence W. Rose, Denver, Colo.

Application August 18, 1955, Serial No. 529,170

7 Claims. (Cl. 155—189)

This invention relates to safety harnesses, and more particularly to safety body harnesses of a type which is especially adapted for wear by children, it being a primary object of the invention to provide a novel and improved child's safety harness which may be used to restrain and protect small children, especially when inside an automobile.

Other objects of the invention are to provide a novel and improved child's safety harness which is especially adapted to hold a small child on the seat of an automobile and which: (a) safeguards the child from accidentally falling off the seat and from being thrown forward from the seat by sudden deceleration or stopping of the automobile; (b) safeguards the child from being thrown forwardly into the automobile windshield or dashboard in case of a head-on collision or sudden stop, or from being thrown against or out of a side door of the automobile as from a side collision or as where the automobile is turned over, or from being thrown against any interior surface of the automobile; (c) includes an arrangement of restraining bands about the childs body which holds the child in a balanced, safe, and relatively comfortable position in case of an accident, and which avoids undue squeezing and cutting of the child's body in the event of a sudden accident where the harness comes into play to protect the child; (d) holds the child upon the automobile seat, yet permits complete freedom of movement of the child thereon to permit him to sit, stand, turn around or to lie down and roll over; (e) permits an adult driver to drive the automobile without having to pay attention to the child; (f) is a versatile unit, providing, among other uses, a harness for walking and for restraining the child in a chair or bed or the like; (g) may be quickly and easily put on or taken off from the child and quickly and easily attached to an automobile seat, but nevertheless difficult for the child to remove the harness or disengage it from the seat attachment; and (h) is simple and sturdy in construction, economical, neat in appearance and strong and durable.

With the foregoing and other objects in view, all of which more fully hereinafter appear, my invention comprises certain novel and improved constructions, combinations and arrangements of parts and elements, as hereinafter described and defined in the appended claims and illustrated in preferred embodiment in the accompanying drawing in which:

Figure 1 is a side elevation view of the child wearing the harness and standing upon the seat of an automobile whereto the harness is attached in accordance with the invention;

Figure 2 is a side elevation view of the harness per se on an enlarged scale;

Figure 3 is an underside view of the upper portion of the harness, as taken from the indicated line 3—3 at Fig. 2, but on an enlarged scale;

Figure 4 is a topside view of the lower portion of the harness, as taken from the indicated line 4—4 at Fig. 2, but on an enlarged scale;

Figure 5 is a fragmentary sectional detail as taken substantially from the indicated line 5—5 at Fig. 3, but on a further enlarged scale;

Figure 10:
Figure 11:
Figure 12:
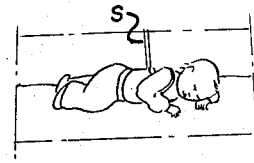
Figure 13:
Figure 14:
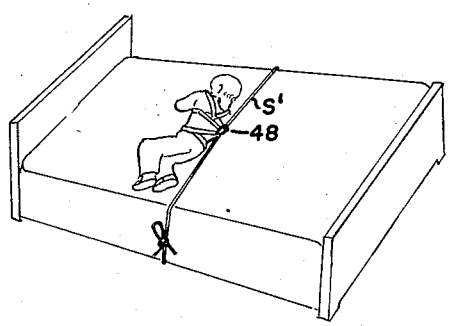

Figures 10, 11, and 12 are sketches illustrating a child wearing the harness which is fastened onto the seat of an automobile and further illustrating the child as being seated, standing, and turned around and lying down;

Figure 13 is a sketch illustrating a child wearing the harness and a leash being attached thereto;

Figure 14 is a sketch illustrating a child wearing the harness and with the harness fastened to a bed to hold the child thereon.

Figure 15:
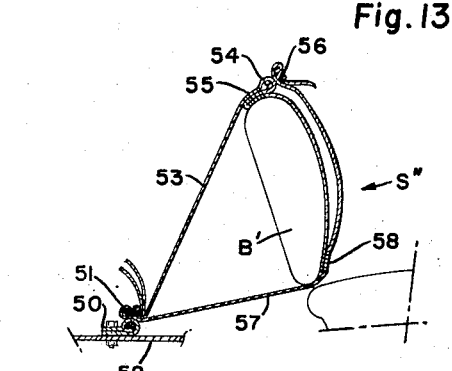

Figure 15 is a sectional elevation view of a seat anchoring strap, modified for attachment to a folding back cushion of an automobile seat.

Referring more particularly to the drawing, the harness comprises an integrated arrangement including a chest harness C and a pelvic harness P, which are interconnected by an attachment linkage L at the back of the units. The harness is especially adapted for use with a fixed restraining strap S which is adapted to be wrapped vertically about a rigidly fixed back cushion B of an automobile seat as clearly illustrated at Fig. 1, and hereinafter described in detail.

The chest harness C includes a chest band 20 connectible in the front thereof by a buckle 21 which is illustrated as a conventional double-ring type buckle but it is to be understood that other types of buckles are suitable for this purpose. A pair of shoulder straps 22 extend from the back of this band to arch upwardly and forwardly for adjustable connection with the front sides of the chest band as by buckles 23, which upstand from the chest band 20 in loops 24, which, in turn, are slidably affixed upon the band 20 for adjustments for an individual. It follows that the chest diameter, shoulder band length, and position of the shoulder band in front of the chest are all adjustably fixable to fit any individual and the harness therefore may be used for children of various size, or be used over a period of time as the child grows.

The attachment linkage L includes a strap loop 25 at the rear of the chest band 20 which joins to the chest band at the approximate rear-side quarter points of the band 20 to extend rearwardly therefrom to a connecting link 26 depending, in turn, from the strap loop 25 to join with a strap loop 27 at the rear of the pelvic harness P as hereinafter described.

To attain a maximum strength with minimum weight of material, the chest band 20 preferably formed of a light-weight flexible nylon web with the strap loop 25 being formed by the same band by a double encirclement thereof. The inner loop of this web which forms the chest band 20 commences at the free end 28, and, when worn, extends through the buckle 21 and about the chest, with the shoulder straps 22 being attached thereto at the rear of the band opposite to the buckle, and thence about the chest to the buckle. There the inner loop terminates and the web is threaded through the buckle elements forming a buckle-holding eye 29. This eye is reinforced by a web-thimble 30 and held in position by stitching 31 at the edge thereof where the looped eye of the web comes together to shape the eye. The web then extends rearwardly along the outside perimeter about the inner loop to the approximate rear side quarter point where it is attached to the inner loop by stitching 32. Thence, the web extends rearwardly from the inner loop from the strap loop 25. This strap loop is attached at the opposite approximate rear-side quarter point by stitching 32 and thence extends forwardly outside and about the inner loop, through the buckle and to the free end 28, where the inner and outer loops are joined by sealing or stitching on both.

This construction, with the double-looped web and with the strap loop 25 placing the connecting link 26 at a substantial distance behind the chest band 20 provides the advantage of a unit which has no stitching connections in the safety system and whenever a child is wearing the harness and the harness is subjected to a shock, as by a sudden stop, the pull of the restraining strap S against the strap loop 25 is directly transmitted through the outer loop of the web to the buckle 21 and without direct strain upon any stitching. Moreover, with the strap loop being connected substantially at the two rear quarter points of the chest band 20, the resulting forces on the child's body, tending to squeeze the child, are considerably diminished as compared with a conventional safety belt construction wherein the strain or pull is transmitted directly to one point at the safety belt as at the rear of the belt.

Figure 6:
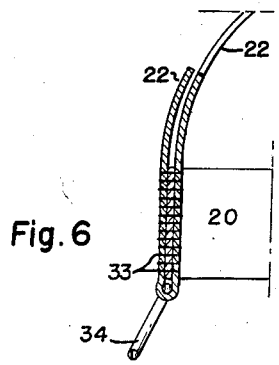
Figure 6 is a fragmentary sectional detail as taken from the indicated line 6—6, at Fig. 3, but on an enlarged scale.

The shoulder straps 22 are formed of a single web of flexible light-weight nylon material or the like, which is folded about the back of the chest band to extend upwardly therefrom at opposite slopes and is affixed in position as by stitching 33. The bottom of the fold is looped to receive a connector ring 34 as clearly illustrated at Fig. 6.

Figure 7:
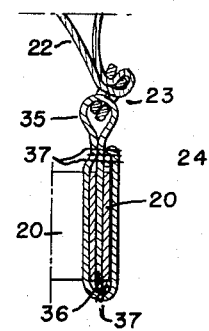
Figure 7 is a fragmentary sectional detail as taken from the indicated line 7—7 at Fig. 3, but on an enlarged scale.

The buckle-carrying loops 24 to which the front end of the shoulder straps 22 are adjustably connected, are formed of lightweight web or other suitable material, and each loop 24 is wrapped about the inner and outer web of the chest band 20 with an end of the wrap extending upwardly to form an eye 35 in which the buckle 23 is mounted. Thence the wrap extends downwardly as a center reach 36 between the two webs of the chest band with the wraps at each end thereof affixed in position as by stitching 37 as clearly illustrated at Fig. 7. This construction permits the loops 24 to be shifted about the chest band 20 to any desired position depending upon the size of the child, but the center reach 35 prevents removal of the free end of the belt from loop 24.

The pelvic harness P includes a pelvic band 38 connectible by a buckle 21'. A crotch strap 39 extends from the front center thereof to arch downwardly and rearwardly for adjustable connection with the rear of the band 37 as by buckle 40 which depends from the pelvic band in a loop 41 affixed thereto. It follows that the pelvic diameter and crotch proportions are adjustable to fit any size child and the buckle may be within the loop at the end of the crotch strap or at either side thereof depending upon the size of the child, and that the crotch strap will hold the pelvic band at the child's pelvis where the pelvis will bear against the strap as in an accident, protecting the child's abdomen.

The strap loop 27 of the attachment linkage L joins the pelvic band 38 at the approximate rear-side quarter points to extend rearwardly therefrom to the connecting link 26.

The pelvic band 38 and strap loop 27 associated therewith is formed in the same manner as the chest band 20, with an inner loop of web forming the band proper and an outer loop forming a portion of the band, with the free end 28', eye 29', thimble 30', stitching 31', stitching at the rear-side quarter points 32' and 32a', being similar to the corresponding elements of the chest band 20 hereinbefore described.

Figure 8:
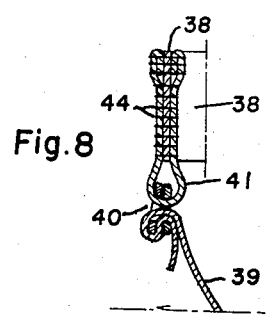
Figure 8 is a fragmentary sectional detail as taken from the indicated line 8—8 at Fig. 4 but on an enlarged scale.
Figure 9:
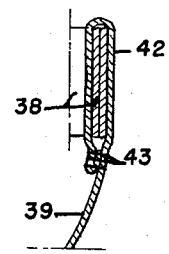
Figure 9 is a fragmentary sectional detail as taken from the indicated line 9—9 at Fig. 4, but on an enlarged scale.

The front end of the crotch strap 39 is slidably affixed to the pelvic band by a simple, loosely-fitted loop 42 of the web of the strap 39. This loop is formed by stitching 43 at the end of the strap as clearly illustrated at Fig. 9. It follows that this front end is therefore adjustable and may be centered upon the band 37. The buckle loop 41 which holds the crotch strap 39 at the rear end, is also formed of lightweight web wrapped upon the inner loop of the pelvic band and affixed thereto as by stitching 44 as clearly illustrated at Fig. 8.

The connecting link 26 is likewise formed of lightweight web wrapped as a full loop about both the strap loops 25 and 27 and affixed thereto by stitching 45 with suitable spacing between the strap loops to permit the loops 25 and 27 to remain separated a proper distance and space the chest band and pelvic band apart when worn by a child.

In use this harness is put on a child with proper adjustment of the various straps to provide for a comfortable fit, and the restraining strap S is wrapped vertically about the rear cushion of either seat of an automobile, and connected thereto as by buckle 46 with the buckle in a position out of reach of the child. This strap is threaded through the loops 25 and 27, of the harness. The child can then move about with considerable freedom and assume any of the standing, sitting or lying positions illustrated at Figs. 1, 10, 11, or 12, but cannot climb or fall off the car seat. When the child leaves the automobile a leash 47 may be attached to the connector ring 34 on the shoulder harness to restrain and assist his movements when walking. Further, a cord or strap S' may be wrapped about a bed and the child fastened thereto by threading the strap S' through the loops 25 and 27 or through the opening in the connecting link 26 in the spacing between the chest and pelvic harnesses, as clearly illustrated at Fig. 14. The connection of the harness linkage L to the strap S' may be affixed as by a knot 48 at a center point of the strap to prevent the child from sliding along the strap S' and falling off the bed.

Fig. 15 shows a modified strap S' which is adapted for wrapping about a tiltable back cushion B, of the type which is often used in the front seat of an automobile. This seat tilts forwardly and it is therefore necessary to modify the strap to provide an effective strap anchor. The strap S' therefore is looped completely about the seat back cushion with the ends extending rearwardly of the cushion to an anchor 50 which includes a buckle 51 for attachment of the strap ends. This anchor is suitably fastened to the floor of the automobile or to any other suitable fixed member of the automobile as at 52.

The strap is formed of two pieces suitably stitched together, the upper portion 53 extending from the buckle 51 to the top of the seat back and there folded upon itself as a loop 54 rigidified by stitching 55 to hold a buckle 56. Thence the strap 53 extends downwardly against the front of the seat back to the base thereof. The lower strap portion 57 extends from the buckle 51 and underneath the seat back to connect with the strap portion 53 at the base of the seat back as by stitching 58. This strap portion 57 then extends upwardly as a free section to be fastened in the buckle 56 at the top of the seat and said free section holds the child's safety belt hereinbefore described.

It is apparent that other uses are possible with this unit as for holding a child in a chair as with a leash strap, and it is also apparent that others skilled in the art can devise and construct alternate and equivalent harness units which are within the spirit and scope of the invention and hence, my protection should be limited only by the proper scope of the appended claims.

I claim:

1. A safety body harness, including, in combination with a restraining anchor strap, a chest band adapted to be fastened about the chest of a wearer, a pelvic band adapted to be fastened about the pelvis of a wearer, and a linkage spacedly interconnecting the bands and being engaged with said anchor strap, said linkage including a strap loop extending from each band with the ends of each loop being connected to the back of its band at the approximate quarter points thereof and a spacing link interconnecting the loops.

2. A safety body harness, including, in combination with a restraining anchor strap, a chest band adapted to be fastened about the chest of a wearer, a pelvic band adapted to be fastened about the pelvis of a wearer, and a linkage spacedly interconnecting the bands and being engaged with said anchor strap, said linkage including a loop extending from each band from the approximate quarter points at the back side of the band, each band and loop being formed of a single strap member by a double wrap of the strap with the inner wrap defining the body band and the outer wrap forming part of the body band and secured at its outer end to the inner wrap and extending from the inner wrap to form the loop.

3. A safety body harness, including, in combination with a vertical seat cushion, a restraining strap adapted to be fastened about the top and bottom of the cushion, an anchor point rearwardly of the cushion, said restraining strap including two portions each having an end connected to said anchor point, one portion extending to the top of the cushion and thence downwardly over the front of the cushion and the other portion extending to the bottom and underneath the cushion and thence upwardly and there being connected to said first portion, band members adapted to be fastened about the body of a wearer and an attachment loop extending from said band members and being adapted to be slideably threaded upon the vertical reach of said restraining strap at the forward side of the cushion.

4. A body band for a safety harness adapted to be fastened about the body of a wearer and including in combination therewith, an anchor loop fastened thereto for attachment to an anchor at a point spaced from and rearwardly of the body band, said loop being formed as a strap having each end extending to and being interconnected with a side of the front portion of the body band and having the center portion of the loop extending rearwardly from the rear portion of the body band with points of separation of the loop from the body band being at each side of the body band whereby to minimize the pressure of the band against the body of the wearer, as when the loop is engaged with an anchor and the wearer moves away from the anchor and such movement is checked by attachment to the anchor.

5. The body band defined in claim 4 wherein the band and anchor loop are formed by a single web wrapped in a double wrap, the inner wrap defining the body-encircling band and the outer wrap having a portion thereof lying against the inner wrap and its outer end secured thereto and having another portion thereof lying away from the inner wrap defining the anchor loop.

6. The body band defined in claim 4, wherein said loop is at the back of the band, a buckle at the front of the band, said band and loop being formed of a single web wrapped in a double wrap, the inner wrap extending from a free end of the web and forming a body-encircling band and extending to and being threaded through the buckle and being turned outwardly and upon itself to form a buckle holding eye, thence, to extend therefrom as the outer wrap and lying against the inner loop and extending to the aforesaid free end but having a portion thereof lying away from the inner wrap whereby forming said anchor loop.

7. The body band defined in claim 6, including shoulder straps to hold the band about the chest, said straps being formed as a single web the center of the web being obliquely folded from the inner body encircling band to extend upwardly thereof and over the shoulders of a wearer with the front portions thereof being attached to the front of the body band at each side thereof.

References Cited in the file of this patent

UNITED STATES PATENTS

| | | |
|---|---|---|
| 579,818 | Cooley | Mar. 30, 1897 |
| 1,193,374 | Gilliam | Aug. 1, 1916 |
| 2,280,694 | Embree et al. | Apr. 21, 1942 |
| 2,288,692 | Fearson et al. | July 7, 1942 |
| 2,413,395 | Ware | Dec. 31, 1946 |
| 2,685,331 | Gauntlett et al. | Aug. 3, 1954 |
| 2,695,052 | Yates et al. | Nov. 23, 1954 |
| 2,699,284 | Rose | Jan. 11, 1955 |
| 2,705,044 | Nolen | Mar. 29, 1955 |
| 2,741,412 | Hinkle | Apr. 10, 1956 |

FOREIGN PATENTS

| | | |
|---|---|---|
| 3,857 | Great Britain | 1892 |
| 128,138 | Great Britain | June 19, 1919 |

OTHER REFERENCES

Mechanix Illustrated, April 1953, vol. 48, No. 6, page 88.